US012642277B1

(12) United States Patent
Salmon

(10) Patent No.: US 12,642,277 B1
(45) Date of Patent: Jun. 2, 2026

(54) FOOD SEASONING INJECTOR

(71) Applicant: Guilbert Salmon, Port St. Lucie, FL (US)

(72) Inventor: Guilbert Salmon, Port St. Lucie, FL (US)

(*) Notice: Subject to any disclaimer, the term of this patent is extended or adjusted under 35 U.S.C. 154(b) by 690 days.

(21) Appl. No.: 18/096,665

(22) Filed: Jan. 13, 2023

(51) Int. Cl.
*A22C 9/00* (2006.01)

(52) U.S. Cl.
CPC .................................... *A22C 9/001* (2013.01)

(58) Field of Classification Search
CPC ...................................................... A22C 9/001
See application file for complete search history.

(56) References Cited

U.S. PATENT DOCUMENTS

| | | | | |
|---|---|---|---|---|
| 3,661,072 A | * | 5/1972 | Allinquant | A22C 17/0053 99/532 |
| 4,257,144 A | * | 3/1981 | Takegoshi | A22C 9/008 452/146 |

| | | | | |
|---|---|---|---|---|
| 5,770,153 A | * | 6/1998 | Wagner | G01N 33/1806 435/288.1 |
| 5,934,187 A | | 8/1999 | Leon | |
| 8,888,570 B2 | | 11/2014 | Doyle | |
| 11,653,682 B2 | * | 5/2023 | Pippin | A23L 13/72 220/361 |
| 2015/0264967 A1 | * | 9/2015 | Adams | A22C 17/0053 99/533 |

* cited by examiner

*Primary Examiner* — Rodolphe Andre Chabreyrie
(74) *Attorney, Agent, or Firm* — Sanchelima & Associates, P.A.; Christian Sanchelima; Jesus Sanchelima

(57) ABSTRACT

A food seasoning injector including a housing assembly and injectors assembly. The housing assembly includes a housing, a cap and housing connectors, wherein the housing is a handheld bowl-shaped container adapted to contain a liquid seasoning for food. The housing includes an opening covered with a cap. The housing connectors are openings in a bottom edge of the housing that fit into the needle connectors included in the injectors assembly. The plurality of needles are attached to the needle connectors which have a sharpened tip to penetrate the food, thereby the liquid seasoning may be impregnated into the food enhancing it with flavor and saving time by covering a bigger portion of the food by means of the plurality of needles.

1 Claim, 3 Drawing Sheets

FOOD SEASONING INJECTOR

BACKGROUND OF THE INVENTION

1. Field of the Invention

The present invention relates to a seasoning injector and, more particularly, to a food seasoning injector that includes a dispenser that can be filled with a liquid seasoning, which can be injected into the food by means of needles.

2. Description of the Related Art

Several designs for food seasoning injectors have been designed in the past. None of them, however, include housing that is filled with marinade, the marinade is injected into the food by means of a plurality of needles attached at a bottom side of the housing, thereby covering a bigger area with liquid seasoning in order to save time.

Applicant believes that a related reference corresponds to U.S. Pat. No. 8,888,570 issued for combination handheld meat tenderizer and marinade injector. Applicant believes that another related reference corresponds to U.S. Pat. No. 5,934,187 issued for marinade applicator. None of these references, however, teach of a handheld container device for multiple hollow needles for injecting a cut of meat with seasoning or marinade wherein the container can be filled with a liquid seasoning or marinade and then the needles are pressed down into the meat wherein the substance is then dispensed internally into the meat.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device that is used to enhance the flavor into the meat, chicken, ham, and the like.

It is another object of this invention to provide a device that injects marinade in a bigger area regarding the food, allowing the user to save time.

It is still another object of the present invention to provide a device to make it easier for everyone to better flavor their meat.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
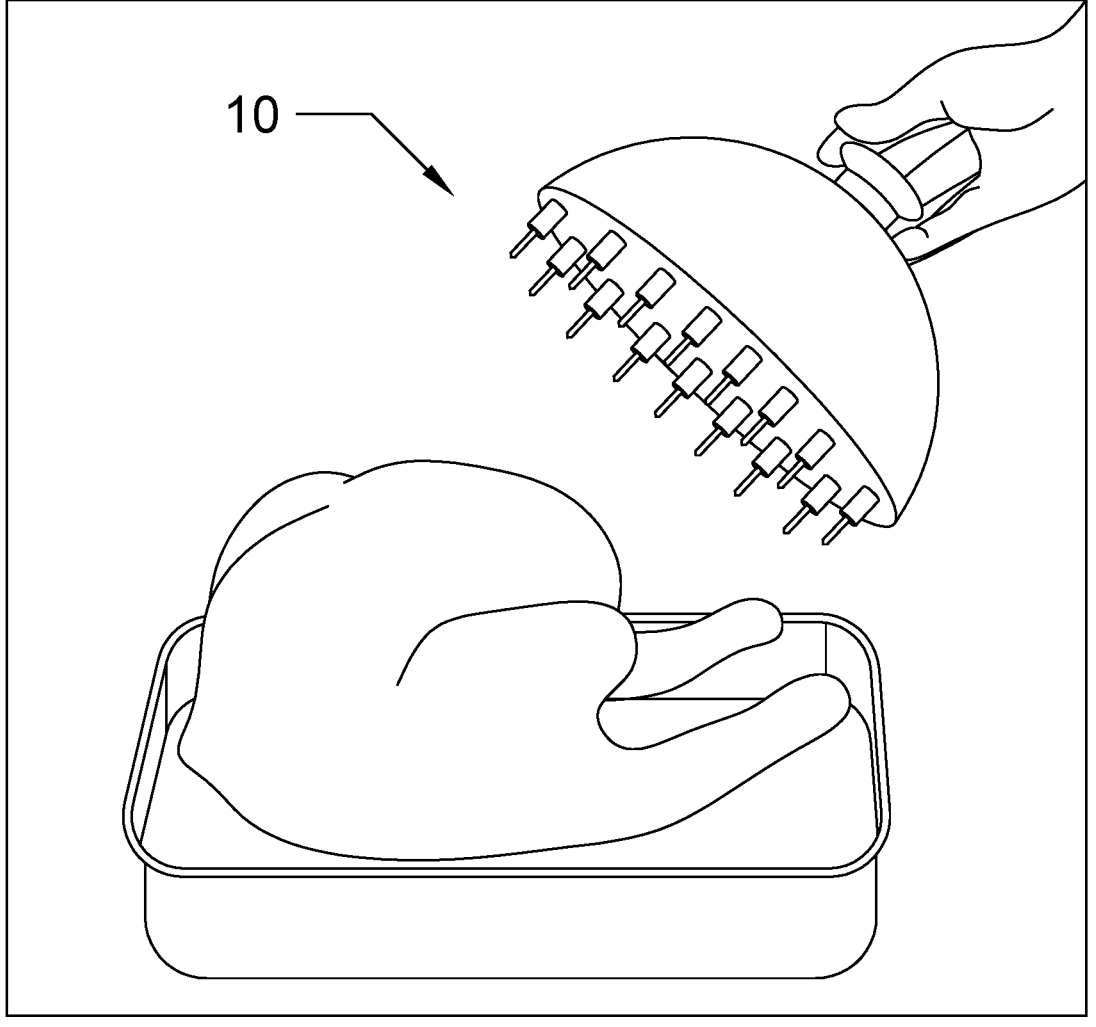
FIG. 1 represents an operational view of an exemplary embodiment of the present invention 10.

Referring now to the drawings, where the present invention is generally referred to with numeral 10, it can be observed that it basically includes a housing assembly 20, and a injectors assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 3:
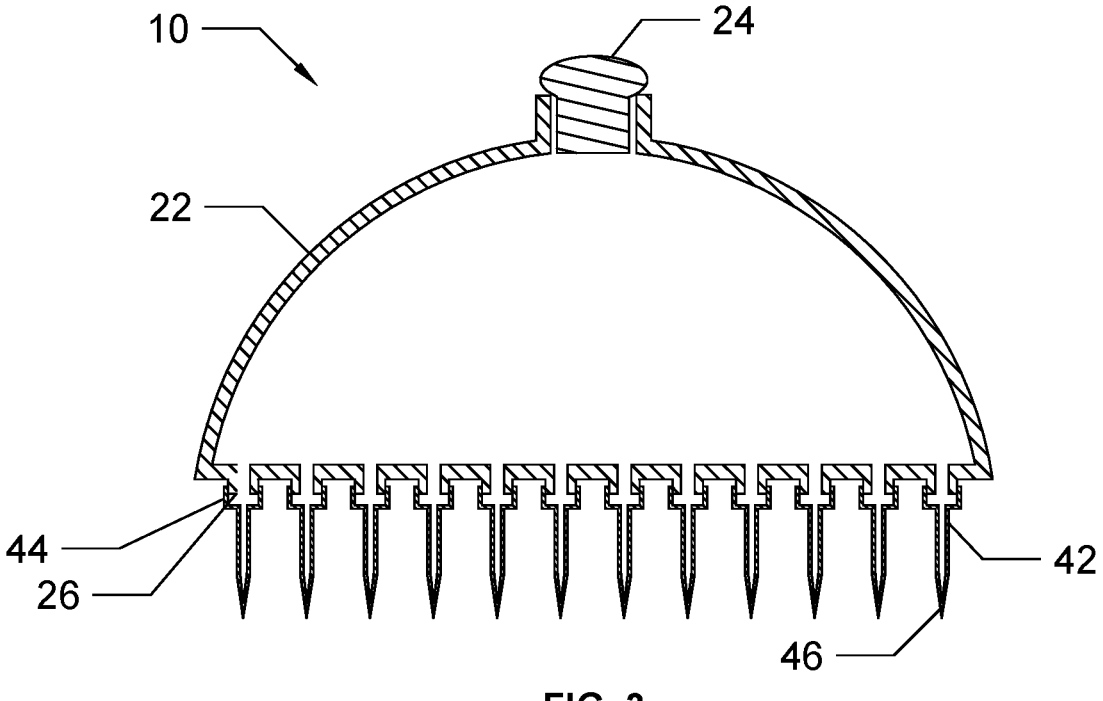
FIG. 3 illustrates a cross-sectional view of the present invention 10, wherein the injectors 42 are coupled to the housing connector 26, thereby a fluid may flow from the hollow body of the housing assembly 20 and the injectors 42 until the tip 46.
Figure 4:
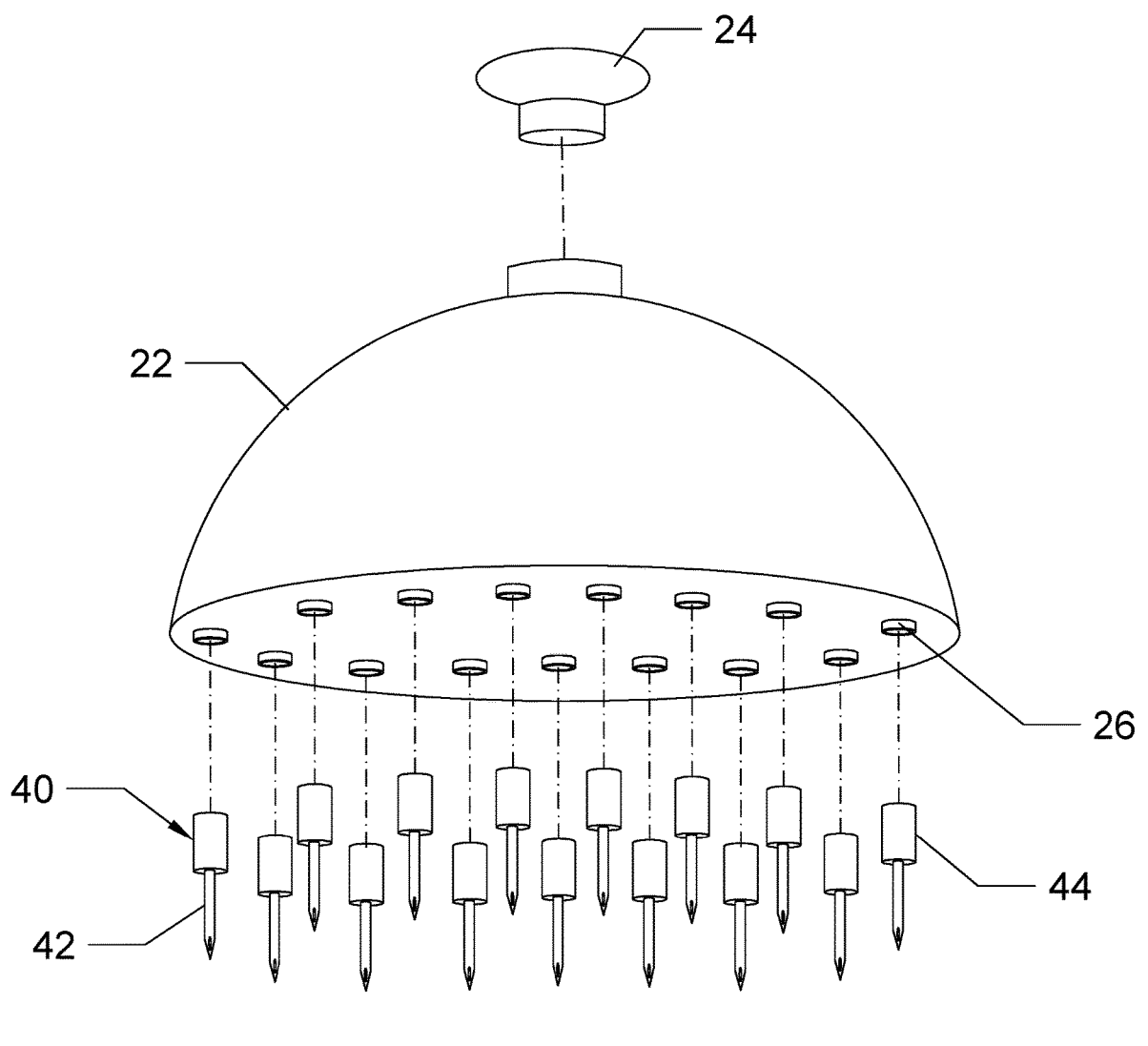
FIG. 4 is a representation of an exploded view of the present invention 10, wherein the injectors assembly 40 and the lid 24 are removably attachable to the housing connector 26 and the housing 22 respectively.

Housing assembly 20 includes a housing 22, a lit 24 and a housing connector 26. In an exemplary embodiment, the housing 22 may have a hollow body which is adapted to contain a liquid seasoning therein, wherein the housing 22 may have an opening in a top portion thereof that is configured to receive the liquid seasoning. In a suitable embodiment, the liquid seasoning may be contained into the bowl-shaped handheld housing 22, wherein the tubular-shaped opening may be covered by a cap 24 made of plastic, ceramic, cork, or the like. As best depicted in FIG. 3. In a preferred embodiment, the housing 22 may be made of ceramic, plastic, stainless steel, or any other suitable food grade material which is configured to contain a liquid seasoning, material, or any other variation thereof that may be injected into the food. In one embodiment, the tubular-shaped opening may be configured to be handled by means of a user's hand. As FIG. 1 illustrates. Nevertheless. It should be considered that the handheld housing 22 may have a suitable volume that is adapted to be handled by the user's hand. Referring to FIG. 4 the ovoid-shaped cap 24 may include a cylinder-shaped bottom portion that fits into the opening, wherein the ovoid-shaped cap 24 is configured to be pressed by the user's hand, thereby the cap 24 may be ergonomic when pressed, nonetheless, it should be considered that the cap 24 may have another ergonomic shape. In other embodiment, the housing connectors 26 may be opening with tubular-shaped protuberances that extend past the bottom edge of the housing 22. As FIG. 4 depicts. The housing connectors 26 are configured to allow the liquid seasoning to pass through thereof, thereby the liquid seasoning may be injected into the food by means of a plurality of needles attached to the housing connectors 26.

Figure 2:
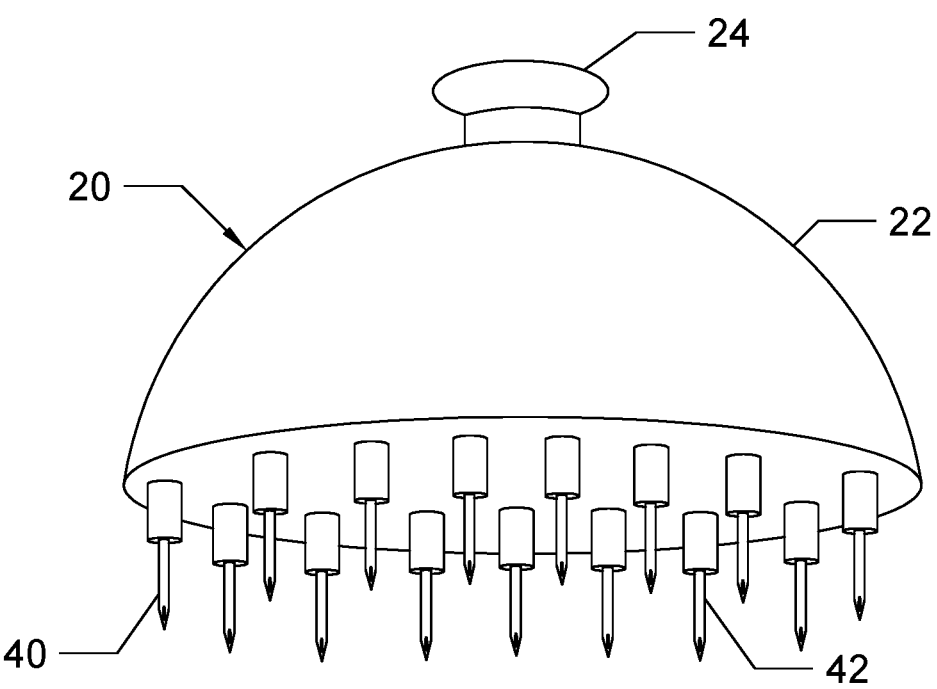
FIG. 2 shows an isometric view of the injectors 42 when attached to the housing assembly 20.

Injectors assembly 40 includes a plurality of needles and needle connectors. In an exemplary embodiment, the plurality of needles 42 may be attached to the housing connectors 26 by means of the needle connectors 44. As FIG. 2 represents. In a suitable embodiment, the tubular-shaped housing connector 26 may fit into the tubular-shaped needle connectors 44. As best illustrated in FIG. 3. In a suitable embodiment, the plurality of needles 42 may be hollow, wherein the plurality of needles 42 may include a tip 46 at the bottom edge thereof. The tip 46 may be sharpened to penetrate the food, wherein an opening is placed on a portion of the sharpened tip 46. As FIG. 5 shows. The plurality of needles 42 are attached to the bottom side of the needle connectors 44, thereby the liquid seasoning may go through the housing 22 where is contained until the tip 46, which by means of the gravity the liquid seasoning may be injected into the food when penetrated by means of the plurality of needles.

Referring to the figures of an exemplary embodiment, and more particularly to FIG. 4, the plurality of needles 42 with the needle connectors 44 may be removably attachable to the housing connectors 26 by coupling the circumferences therebetween, by means of a threaded connection therebetween, or any other suitable coupling. Referring to FIG. 1, the user may include into the housing a predetermined liquid seasoning to penetrate the food until a predetermined depth, thereby the liquid seasoning may be impregnated into the food, wherein the area that cover the plurality of needles when injected may save time and the food may be enhanced with flavor when cooking.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A food seasoning injector, consisting of:

a housing assembly including a housing, a cap and housing connectors, wherein said housing is a handheld bowl-shaped container that is configured to contain a liquid seasoning for food, said housing is made of a food grade material that prevents said liquid seasoning from being contaminate, said housing has an opening covered by said cap, said opening is placed in a top portion of said housing, wherein said opening has a tubular portion, said cap has an ovoid portion with a cylindrical bottom portion that is configured to fit into said tubular portion of said opening, said housing connectors are openings formed in a bottom edge of said housing; and injectors assembly having a plurality of needles and a plurality of needle connectors, wherein said plurality of needle connectors are removably attachable to said housing connectors, wherein said housing connectors are tubular protuberances that extend past said bottom edge of said housing, said plurality of needles are attached to a bottom edge of said plurality of needle connectors, said plurality of needle connectors have a shape that conforms with said shape of said housing connectors, thereby said housing connectors fit into said plurality of needle connectors, wherein said plurality of needles include a tip on a bottom portion thereof, said tip has a sharpened edge with an opening on a portion thereof, thereby said liquid seasoning contained into said housing goes through the plurality of needles and comes out from said opening of said tip to impregnate said food with said seasoning liquid.

* * * * *